(12) United States Patent
Ren et al.

(10) Patent No.: US 10,456,746 B2
(45) Date of Patent: Oct. 29, 2019

(54) SELECTIVE CATALYTIC REDUCTION FILTER FOR REDUCING NITROUS OXIDE FORMATION AND METHODS OF USING THE SAME

(71) Applicant: GM GLOBAL TECHNOLOGY OPERATIONS LLC, Detroit, MI (US)

(72) Inventors: Shouxian Ren, Rochester Hills, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 15/894,281

(22) Filed: Feb. 12, 2018

(65) Prior Publication Data
US 2019/0247792 A1    Aug. 15, 2019

(51) Int. Cl.
| | | |
|---|---|---|
| *B01J 29/06* | (2006.01) | |
| *B01D 53/94* | (2006.01) | |
| *B01J 29/76* | (2006.01) | |
| *B01J 35/00* | (2006.01) | |
| *B01J 35/04* | (2006.01) | |
| *F01N 3/035* | (2006.01) | |
| *F01N 3/20* | (2006.01) | |
| *B01J 29/072* | (2006.01) | |
| *B01J 29/80* | (2006.01) | |
| *B01J 37/02* | (2006.01) | |
| *F01N 3/28* | (2006.01) | |

(52) U.S. Cl.
CPC ....... *B01D 53/9418* (2013.01); *B01D 53/944* (2013.01); *B01D 53/9431* (2013.01); *B01D 53/9477* (2013.01); *B01J 29/072* (2013.01); *B01J 29/763* (2013.01); *B01J 29/7615* (2013.01); *B01J 29/80* (2013.01); *B01J 35/0006* (2013.01); *B01J 35/04* (2013.01); *B01J 37/0215* (2013.01); *B01J 37/0225* (2013.01); *B01J 37/0246* (2013.01); *F01N 3/035* (2013.01); *F01N 3/208* (2013.01); *B01D 2201/32* (2013.01); *B01D 2239/0464* (2013.01); *B01D 2239/0478* (2013.01); *B01D 2255/50* (2013.01); *B01D 2255/502* (2013.01); *B01D 2255/903* (2013.01); *B01D 2255/9045* (2013.01); *B01D 2255/915* (2013.01); *B01D 2255/9155* (2013.01); *B01D 2257/40* (2013.01); *B01D 2257/404* (2013.01); *B01D 2258/01* (2013.01); *B01D 2279/30* (2013.01); *B01J 2229/186* (2013.01); *F01N 3/28* (2013.01); *F01N 2510/063* (2013.01); *F01N 2610/02* (2013.01)

(58) Field of Classification Search
CPC .... B01J 29/072; B01J 29/7615; B01J 29/763; B01J 29/80; B01J 2229/186; B01J 35/04; B01J 37/0215; B01J 37/0225; B01J 37/0246; B01D 53/9418; B01D 53/9431; B01D 53/9477; B01D 2257/40; B01D 2257/404; B01D 2255/50; B01D 2255/502; B01D 2255/903; B01D 2255/9032; B01D 2255/9045; B01D 2255/915; B01D 2255/9155; B01D 2201/32; B01D 2239/0464; B01D 2239/0478; B01D 2258/01; B01D 2279/30; F01N 3/035; F01N 3/2066; F01N 2250/02; F01N 2255/9155; F01N 2230/02; F01N 2570/14
USPC .............. 502/60, 63, 64, 67, 69, 74, 527.19, 502/527.23, 527.24; 422/177, 180
See application file for complete search history.

(56) References Cited

U.S. PATENT DOCUMENTS

| | | | |
|---|---|---|---|
| 7,601,662 B2 | 10/2009 | Bull et al. | |
| 2011/0300042 A1* | 12/2011 | Bull ................... | B01D 53/9418 423/213.2 |
| 2013/0149207 A1* | 6/2013 | Castagnola .......... | B01J 35/0006 422/177 |
| 2014/0093442 A1* | 4/2014 | Spreitzer .............. | B01D 53/944 423/239.1 |
| 2014/0130760 A1* | 5/2014 | Sumiya ................ | B01J 37/0244 123/1 A |
| 2015/0152768 A1* | 6/2015 | Arulraj ................. | F01N 3/2828 428/117 |
| 2015/0217282 A1* | 8/2015 | Fedeyko .................. | B01J 29/74 423/213.5 |
| 2018/0111089 A1* | 4/2018 | Li ...................... | B01D 53/9418 |

(Continued)

FOREIGN PATENT DOCUMENTS

WO   WO-2008132452 A2    11/2008

OTHER PUBLICATIONS

Cavataio, Giovanni et al. "Laboratory Testing of Urea-SCR Formulations to Meet Tier 2 Bin 5 Emissions", *SAE Technical Paper Series*, 2007-01-1575, 2007, 16 pages.

(Continued)

*Primary Examiner* — Elizabeth D Wood
(74) *Attorney, Agent, or Firm* — Harness, Dickey & Pierce, P.L.C.

(57) ABSTRACT

A selective catalytic reduction filter (SCRF) including a wall-flow substrate having inlet channels and outlet channels is provided. A first selective catalytic reduction (SCR) catalyst zone is present in the inlet channels, and a second SCR catalyst zone is present in the outlet channels. The first SCR catalyst zone includes an iron-exchanged zeolite catalyst, and the second SCR catalyst zone includes a copper-exchanged zeolite catalyst. Exhaust gas treatment systems including the SCRF and methods of reducing production of nitrous oxide ($N_2O$) during selective catalytic reduction of an exhaust gas stream using the SCRF are also provided herein.

8 Claims, 4 Drawing Sheets

(56) References Cited

U.S. PATENT DOCUMENTS

2018/0119589 A1\* 5/2018 Chandler ............. B01D 53/944
2018/0264446 A1\* 9/2018 Burgess .................... F01N 3/28

OTHER PUBLICATIONS

Lambert, C., Dobson, D., Gierczak, C., Guo, G., Ura, J. and Warner, J. (2014) "Nitrous oxide emissions from a medium-duty diesel truck exhaust system", *Int. J. Powertrains*, vol. 3, No. 1, pp. 4-25.
"Mitigating N2O from Aftertreatment Systems," Research Disclosure, Database No. 624089 (Published Mar. 23, 2016).

\* cited by examiner

SELECTIVE CATALYTIC REDUCTION FILTER FOR REDUCING NITROUS OXIDE FORMATION AND METHODS OF USING THE SAME

INTRODUCTION

The present disclosure relates generally to exhaust gas treatment systems, and more specifically, to a selective catalytic reduction filter (SCRF) and methods of using the same which can reduce production of nitrous oxide ($N_2O$), for example, during reduction of nitrogen oxides ($NO_x$).

In a diesel engine, the exhaust gas must be treated properly to remove harmful pollutants before being released to the atmosphere. The exhaust gas passes through a catalytic converter system that typically includes a DOC (diesel oxidation catalyst), an SCRF, and a selective catalytic reduction (SCR) catalyst. The DOC oxidizes carbon monoxide (CO) and hydrocarbons (HC), and nitric oxide (NO) to nitrogen dioxide ($NO_2$), carbon dioxide ($CO_2$) and water ($H_2O$). The DOC may also behave like a "diesel burner" to oxidize the injected diesel fuel to generate exotherm for supporting periodic soot oxidations or diesel particulate filter (DPF) regenerations. The SCRF is a combination of SCR catalyst and DPF technologies.

A diesel exhaust fluid (DEF) injection system injects urea solution into the exhaust to provide ammonia ($NH_3$) to reduce nitrogen oxides (NOx) to harmless nitrogen and water in the presence of the SCR catalyst. Diesel exhaust contains relatively high levels of particulate matters (PM), which is also known as soot. The catalytic converter generally cannot remove elemental carbon, such as soot; soot is usually cleaned up by the DPF. The SCR is an individual catalytic converter that reduces the residual nitrogen oxides ($NO_x$) by ammonia ($NH_3$) from the exhaust gas.

The catalytic converter system containing the SCRF, though removing harmful emissions components, is not optimally efficient because of the undesirable production of nitrous oxide ($N_2O$) when using ammonia ($NH_3$) to reduce nitrogen oxides resulting in the potential release of nitrous oxide ($N_2O$) in amounts which exceed regulatory requirements. Thus, there is a need for exhaust systems, particularly an SCRF design which can effectively reduce nitrogen oxides ($NO_x$) to nitrogen ($N_2$) and water ($H_2O$) while also limiting or reducing undesirable production of nitrous oxide ($N_2O$).

SUMMARY

This section provides a general summary of the disclosure, and is not a comprehensive disclosure of its full scope or all of its features.

In certain aspects, the present disclosure provides a selective catalytic reduction filter (SCRF) including a wall-flow substrate defining inlet channels for receiving exhaust gas and outlet channels through which the exhaust gas exits, wherein the inlet channels and the outlet channels are connected to one another through porous walls of the inlet and outlet channels. The SCRF may further include a first selective catalytic reduction (SCR) catalyst zone present in the inlet channels and a second SCR catalyst zone present in the outlet channels. The first SCR catalyst zone may have a first SCR catalyst loading and may include a first SCR catalyst coating including an iron-exchanged zeolite. The second SCR catalyst zone may have a second SCR catalyst loading and may include a second SCR catalyst coating including a copper-exchanged zeolite. The combined first SCR catalyst loading and the second SCR catalyst loading may be less than or equal to about 200 g/l.

The combined first SCR catalyst loading and the second SCR catalyst loading may be about 110-200 g/l.

The first SCR catalyst loading can be about 40-100 g/l and/or the second SCR catalyst loading can be about 70-100 g/l.

The first SCR catalyst coating and/or the second SCR catalyst coating can further include a binder.

Iron may be present in amount from about 0.5-15 wt. % in the iron-exchanged zeolite and/or copper may be present in amount from about 0.5-10 wt. % in the copper-exchanged zeolite.

The zeolite of the iron-exchanged zeolite can have a BEA framework type and/or the zeolite of the copper-exchanged zeolite can have a CHA framework type.

The iron-exchanged zeolite may be Fe-beta and/or the copper-exchanged zeolite may be Cu-chabazite.

The substrate may be formed from a ceramic or metallic material.

In other aspects, the present disclosure provides an exhaust gas treatment system including an oxidation catalyst (OC) unit for receiving exhaust gas; a selective catalytic reduction filter (SCRF) in fluid communication with the OC unit to receive exhaust gas flow therefrom, and an injection device for injecting urea or ammonia into the exhaust gas flow. The SCRF may include a wall-flow substrate defining inlet channels for receiving exhaust gas flow from the OC unit and outlet channels through which the exhaust gas exits, wherein the inlet channels and the outlet channels are connected to one another through porous walls of the inlet and outlet channels. The SCRF may further include a first SCR catalyst zone present in the inlet channels and a second SCR catalyst zone present in the outlet channels. The first SCR catalyst zone may have a first SCR catalyst loading and may include a first SCR catalyst coating including an iron-exchanged zeolite and optionally, a binder. The second SCR catalyst zone may have a second SCR catalyst loading and may include a second SCR catalyst coating including a copper-exchanged zeolite and optionally, a binder. The combined first SCR catalyst loading and the second SCR catalyst loading may be less than or equal to about 200 g/l.

The system may further include an SCR catalyst connected to the SCRF for reducing nitrogen oxides.

The combined first SCR catalyst loading and the second SCR catalyst loading may be about 110-200 g/l.

The first SCR catalyst loading can be about 40-100 g/l and/or the second SCR catalyst loading can be about 70-100 g/l.

The first SCR catalyst coating and/or the second SCR catalyst coating can further include a binder.

Iron may be present in amount from about 0.5-15 wt. % in the iron-exchanged zeolite and/or copper may be present in amount from about 0.5-10 wt. % in the copper-exchanged zeolite.

The zeolite of the iron-exchanged zeolite can have a BEA framework type and/or the zeolite of the copper-exchanged zeolite can have a CHA framework type.

The iron-exchanged zeolite may be Fe-beta and/or the copper-exchanged zeolite may be Cu-chabazite.

In other aspects, the present disclosure provides a method for reducing production of nitrous oxide ($N_2O$) during selective catalytic reduction of an exhaust gas stream. The method may include contacting the exhaust gas stream including nitrogen oxides ($NO_x$) and ammonia ($NH_3$) with a selective catalytic reduction filter (SCRF) and converting the nitrogen oxides to nitrogen ($N_2$) and water ($H_2O$) to produce a treated exhaust gas stream. The SCRF may include a wall-flow substrate defining inlet channels for receiving the exhaust gas stream and ammonia and outlet channels through which the treated exhaust gas exits, wherein the inlet channels and the outlet channels are connected to one another through porous walls of the inlet and outlet channels. The SCRF may further include a first SCR catalyst zone present in the inlet channels and a second SCR catalyst zone present in the outlet channels. The first SCR catalyst zone may have a first SCR catalyst loading and may include a first SCR catalyst coating including an iron-exchanged zeolite and optionally, a binder. The second SCR catalyst zone may have a second SCR catalyst loading and may include a second SCR catalyst coating including a copper-exchanged zeolite and optionally, a binder. The combined first SCR catalyst loading and the second SCR catalyst loading may be less than or equal to about 200 g/l.

The treated exhaust gas stream may include less than about 2 vol. % N2O.

The SCRF may have one or more of the following: (i) the combined first SCR catalyst loading and the second SCR catalyst loading may be about 110-200 g/l; (ii) the first SCR catalyst loading may be about 40-100 g/l; (iii) the second SCR catalyst loading may be about 70-100 g/l; (iv) iron may be present in amount from about 0.5-15 wt. % in the iron-exchanged zeolite; and (v) copper may be present in amount from about 0.5-10 wt. % in the copper-exchanged zeolite.

The zeolite of the iron-exchanged zeolite can have a BEA framework type and/or the zeolite of the copper-exchanged zeolite can have a CHA framework type.

The iron-exchanged zeolite may be Fe-beta and/or the copper-exchanged zeolite may be Cu-chabazite.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
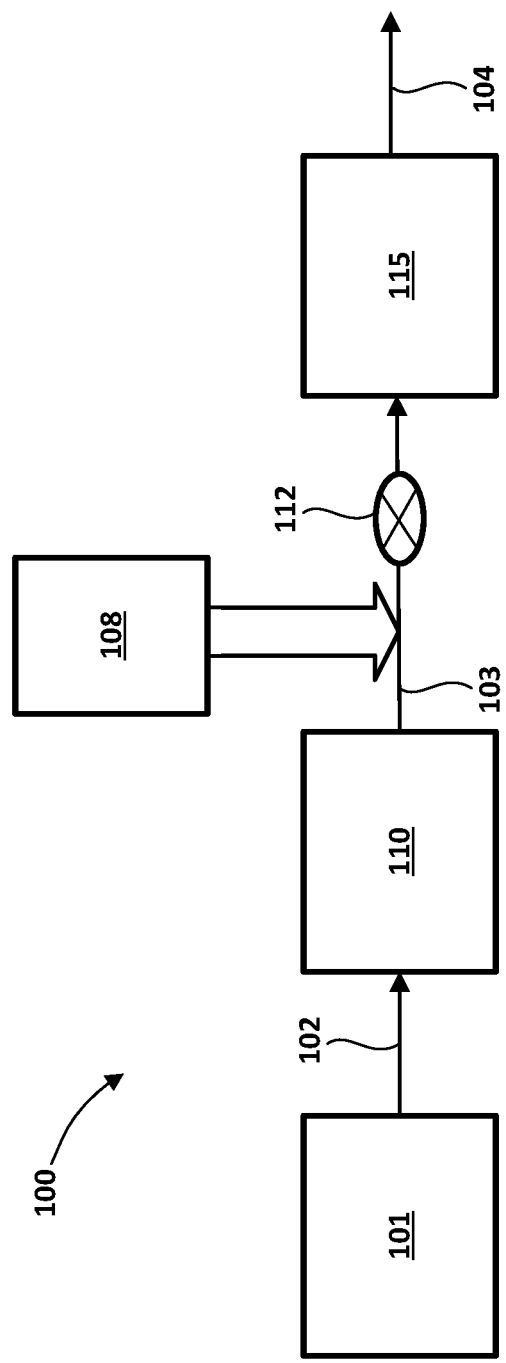
FIG. 1A is a schematic illustration of an exhaust gas treatment system according to one aspect of the disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

I. Exhaust Gas Treatment System

Figure 1B:
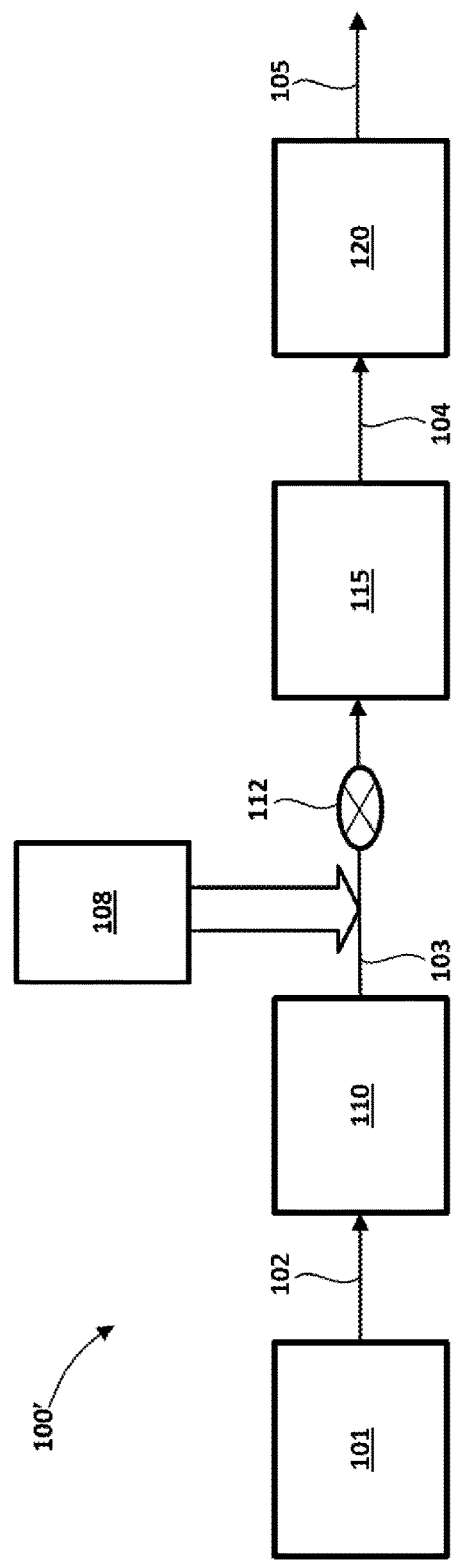
FIG. 1B is a schematic illustration of an exhaust gas treatment system according to another aspect of the disclosure.

An exhaust gas treatment system for treating exhaust gas in an engine is provided herein. The exhaust gas treatment system can be used for treating exhaust gas in a diesel engine or a lean-burn gasoline engine. Typically, in an exhaust gas treatment system, exhaust gas my contact an oxidation catalyst (OC), such as a diesel oxidation catalyst (DOC), followed by contact with a selective catalytic reduction filter (SCRF) in the presence of a reductant, such as ammonia, and optionally further contact a selective catalytic reduction (SCR) catalyst. For example, FIG. 1A illustrates an exhaust gas treatment system 100 (also referred to herein as "system 100") for treating exhaust gas, for example, in a diesel engine. System 100 can includes an oxidation catalyst (OC) unit 110 for receiving exhaust gas 102 from an engine 101, and a selective catalytic reduction filter (SCRF) 115 in fluid communication with the OC unit 110 to receive exhaust gas flow 103 therefrom. The exhaust gas 102 may include hydrocarbons (HC), carbon monoxide (CO), nitrogen oxides ($NO_x$), and particulate matter (PM) as well as other components. The system 100 may further include an injection device 108 for providing ammonia to the system 100 for mixing with the exhaust gas flow 103 via a mixer 112. Optionally, as shown in FIG. 1B, a system 100' may also include an SCR catalyst 120 in fluid communication with the SCRF 115.

A. Oxidation Catalyst (OC) Unit

The OC unit 110 (e.g., DOC unit) may be in fluid communication with the engine 101 and is configured to oxidize certain constituents of the exhaust gas flow 102 to produce exhaust gas flow 103 comprising unregulated by-products or constituents that are adapted for further treatment in other components of exhaust treatment system 100, as described herein. Generally, the OC unit 110 may be a flow-through device, as described herein, that consists of a metal or ceramic monolith or substrate having a honeycomb-like structure that includes a plurality of generally parallel, longitudinally-extending, interconnected cells that provide a network comprising a plurality of flow channels for receiving the exhaust gas flow 102 and are separated by a corresponding network of cell walls. The substrate has a large surface area along the cell walls. The cell walls have a washcoat that includes a porous ceramic matrix with a surface that is coated with an OC, such as a DOC. For example, the washcoat includes a porous ceramic matrix with a surface that is coated with a catalytically active amount of a Pt group metal catalyst. Suitable platinum group metals include Pt, Pd, Rh, Ru, Os or Ir, or a combination thereof. Of these, Pt or Pd, or combinations thereof, including alloys thereof, are particularly useful. Those that include both Pt and Pd are particularly useful, such as those having Pt:Pd ratios of about 10:4 to about 1:10. As the exhaust gas flow 102 traverses the length of the OC unit 110, particularly the flow channels and the washcoated cell walls, the platinum group metal catalyst may catalyze the oxidation of CO to $CO_2$, as well as catalyzing the oxidation of various hydrocarbons (HC), including gaseous hydrocarbons and liquid hydrocarbon particles, including unburned fuel or oil, or fuel or other HC reductants that are introduced into exhaust gas treatment system to form $CO_2$ and $H_2O$, thereby reducing harmful emissions.

In various aspects, the OC unit 110 may be capable of converting various regulated exhaust constituents to other regulated or unregulated exhaust constituents through oxidation. For example, the OC unit 110 may be configured to oxidize hydrocarbons (HC) to carbon dioxide $CO_2$ and water ($H_2O$), convert carbon monoxide (CO) to carbon dioxide ($CO_2$) and convert nitrogen oxide (NO) to nitrogen dioxide ($NO_2$), or otherwise. Below are exemplary oxidation reactions contemplated with the OC unit 110 of the present disclosure:

$$HC + O_2 \rightarrow CO_2 \pm H_2O \tag{1}$$

$$CO + \tfrac{1}{2}O_2 \rightarrow CO_2 \tag{2}$$

$$NO + \tfrac{1}{2}O_2 \rightarrow NO_2 \tag{3}$$

$$HC + NO_x \rightarrow N_2O + H_2O + CO_2 \tag{4}$$

It should be appreciated that the OC unit 110 may be configured to perform any one of the above conversions, combinations of the above conversions, or even all of the above conversions, depending on the reactant compounds and their concentrations found in the exhaust gas flow 102, the temperature of OC unit 110, and the platinum group metals selected as the catalyst. Other oxidations are contemplated as well, such as oxidation of aldehydes, polycyclic aromatic hydrocarbons or otherwise. Further, the reactions in OC unit 110 unit may be used to reduce the odor of certain emission components.

The OC unit 110 may be housed within a separate housing, including a metal housing, such as a metal can having an inlet opening and outlet opening, or otherwise, configured for providing support and directing fluid flow to the OC unit 110. The housing may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC unit 110 to an exhaust pipe and/or another component of the exhaust gas treatment system 100. It should be appreciated that OC unit 110 may include one or more additional components for facilitating in operation of OC unit 110 or exhaust gas treatment system 100, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise).

It is advantageous to locate the OC unit 110 proximate to the engine 101, preferably as close to the engine as possible, in order to maintain an operating temperature within the OC unit 110 of at least about 356° F. (about 180° C.), and more preferably in the range of about 482° F. (about 250° C.) to about 842° F. (about 450° C.).

B. Selective Catalytic Reduction Filter (SCRF)

The SCRF 115 is a combination of SCR and DPF technologies and controls both NOx and particulate matter (PM, also known as soot) emissions simultaneously. In the system 100, the SCRF 115 reduces NOx using a reductant, such as ammonia ($NH_3$). The ammonia may be introduced in the system 100 through a urea solution, e.g. a diesel exhaust fluid (DEF) solution, injected into the exhaust gas stream 103 through an injector device 108 and mixed with the exhaust gas flow 103 via a mixer 112. The urea solution mixes with the hot exhaust gas and produces ammonia ($NH_3$), which is an agent for reducing NOx in the exhaust gas. In other variations, the reductant can include fuel, particularly diesel fuel and fractions thereof as well as any hydrocarbons and oxygenated hydrocarbons collectively referred to as an HC reductant.

The SCRF 115 includes selective catalytic reduction (SCR) catalyst compositions disposed on a substrate. As used herein, the term "SCR catalyst" refers broadly to a catalyst capable of selective catalytic reduction including catalyzing a reaction of $NO_x$ with a reductant as described herein to reduce the $NO_x$. The substrate may be any of those materials typically used for preparing catalysts, and can usually comprise a ceramic or metal material. For example, the ceramic substrate may include a suitable refractory material, e.g., cordierite, cordierite-alumina, silicon nitride, silicon carbide, zircon mullite, spodumene, alumina-silica magnesia, alumina titanate, zircon silicate, sillimanite, a magnesium silicate, zircon, metalize, alpha-alumina, an aluminosilicate and the like. A metallic substrate may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

Figure 2:
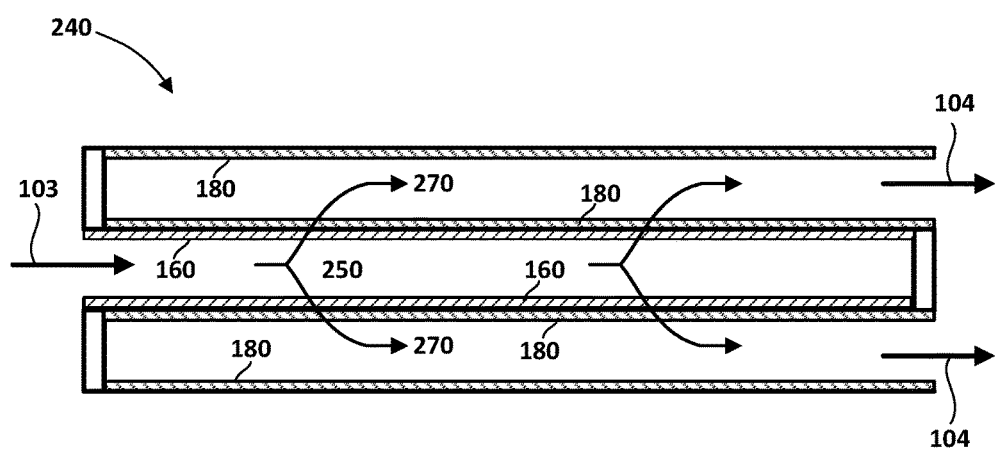
FIG. 2 is a cross-sectional view of a selective catalytic reduction filter (SCRF) wall-flow substrate according to one aspect of the disclosure.

Suitable substrates include a monolithic substrate, such as a wall-flow honeycomb substrate or monolith, where adjacent channels are alternately blocked, allowing a gaseous stream entering the channels from one direction (inlet direction), to flow through porous channel walls and exit from the channels from the other direction (outlet direction). FIG. 2 illustrates channels in a wall-flow honeycomb monolith (further described below). Catalytic material may be disposed as a washcoat on the channels (inlet and outlet) of a wall-flow substrate. The porous channel walls may also act as a filter medium and trap PM in the exhaust gas. The wall-flow filter substrate can be made from materials commonly known in the art, such as cordierite, aluminum titanate or silicon carbide. It will be understood that the loading of the catalytic composition on a wall-flow substrate will depend on substrate properties such as porosity and wall thickness, and can be lower than loading on a flow-through substrate. In other variations, the substrate may be a flow through substrate.

In various aspects, the substrate may define inlet channels for receiving exhaust gas flow, for example, from the OC unit 110, and outlet channels through which the exhaust gas flow exits, wherein the inlet region and the outlet region are connected to one another, for example through porous walls of the inlet and outlet channels. As depicted in FIG. 2, the SCRF 115 may be a wall-flow honeycomb substrate 240. As shown in FIG. 2, the wall-flow substrate 240 comprises an inlet channel 250 and outlet channels 270. While FIG. 2 depicts only one inlet channel 250 and two outlet channels 270, it is contemplated herein that the substrate 240 may include more than one inlet channel 250 (more than 10, more than 50, more than 100 channels, etc.), for example, a plurality of a plurality of inlet channels 250, and more than two outlet channels 270 (more than 10, more than 50, more than 100 channels, etc.), for example, a plurality of outlet channels 270. The arrows in FIG. 2 depict the flow of exhaust gas flow 103 entering inlet channel 250 and flowing through the porous channel walls to outlet channels 270 and exiting the substrate 240 as exhaust gas flow 104.

The SCRF 115 includes a first selective catalytic reduction (SCR) catalyst zone present in the inlet channels, for example, inlet channel 250. Additionally or alternatively, SCRF 115 includes a second SCR catalyst zone present in the outlet channels, for example, outlet channel 270. The first SCR catalyst zone comprise a first SCR catalyst coating 160, for example, disposed on a least a portion of the walls of inlet channel 250. The second SCR catalyst zone comprises a second SCR catalyst coating 180 for example, disposed on a least a portion of the walls of outlet channels 270. The combination of the first SCR catalyst coating 160 and the second SCR catalyst coating 180 is capable of reducing $NO_x$ present in exhaust gas flow 103 to $N_2$ and $H_2O$ selectively over a competing reaction of oxygen and ammonia. The $N_2$ and $H_2O$ produced in SCRF 115 may exit SCRF 115 via an exhaust gas flow 104. In addition, this optimal SCR catalyst combination can substantially reduce the formation of nitrous oxide ($N_2O$), a by-product of this SCR reaction.

The first SCR catalyst coating 160 may comprise a first SCR catalyst, such as an iron-exchanged zeolite. As used herein, "zeolite" is defined to refer to a synthetic or natural crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

The iron-exchanged zeolite may have a BEA framework type. Examples of suitable BEA zeolites include, but are not limited to beta, Al-rich beta, CIT-6, Tschernichite, and pure silica beta. In various aspects, the iron-exchanged zeolite may be iron-beta (Fe-beta).

The iron in the iron-exchanged zeolite may be present in an amount of about 0.5-15 wt. % based on total weight of the iron-exchanged zeolite. It is contemplated herein that iron may be present as exchanged with the exchanged sites in the zeolite as well as present as non-exchanged iron. The non-exchanged iron may be in salt form within the first SCR catalyst or in oxide form upon calcination of the first SCR catalyst during preparation.

The second SCR catalyst coating 180 may comprise an SCR catalyst, such as a copper-exchanged zeolite. The copper-exchanged zeolite may have a CHA framework type. Examples of suitable CHA zeolites include, but are not limited to chabazite, SSZ-13, DAF-5, LZ-218, Linde D, Linde R, Phi, UiO-21, ZK-14, and ZYT-6. In various aspects, the copper-exchanged zeolite may be copper-chabazite (Cu-chabazite).

The copper in the copper-exchanged zeolite may be present in an amount of about 0.5-10 wt. % based on total weight of the copper-exchanged zeolite. It is contemplated herein that copper may be present as exchanged with the exchanged sites in the zeolite as well as present as non-exchanged copper. The non-exchanged copper may be in salt form within the second SCR catalyst or in oxide form upon calcination of the second SCR catalyst during preparation.

A person of ordinary skill in the art knows how to make the aforementioned zeolites. For example, see the references provided in the International Zeolite Association's database of zeolite structures found at www.iza-structure.org/databases In various aspects, the first SCR catalyst coating 160 may have a first SCR catalyst (washcoat) loading (grams of iron-exchanged zeolite per liter of washcoating) and the second SCR catalyst coating 180 may have a second SCR catalyst (washcoat) loading (grams of copper-exchanged zeolite per liter of washcoating). The combined first SCR catalyst loading and the second SCR catalyst loading may be less than or equal to about 300 g/l, less than or equal to about 250 g/l, less than or equal to about 200 g/l, less than or equal to about 150 g/l, or less than or equal to about 125 g/l; or in a range of about 100-300 g/l, about 110-250 g/l, about 110-200 g/l, or about 150-200 g/l.

In some embodiments, the first SCR catalyst coating 160 may have a first SCR catalyst loading of less than or equal to about 150 g/l, less than or equal to about 100 g/l, less than or equal to about 75 g/l, or less than or equal to about 50 g/l. The first SCR catalyst loading may be from about 40 g/l to about 100 g/l. The first SCR catalyst loading may be present on about 40-100% of maximum loading in the first SCR catalyst zone, where maximum loading may be about 100-150 g/l, preferably 100 g/l. Additionally or alternatively, the first SCR catalyst coating 160 may be present on a portion of the inlet channel(s) 250 or on substantially all of the inlet channel(s) 250. "Substantially all of the inlet channels" refers to greater than or equal 98%, greater than or equal to 99% or 100% of the inlet channels. It is contemplated herein that the first SCR catalyst coating 160 may have a substantially uniform thickness throughout the inlet channel(s) 250. Additionally or alternatively, the first SCR catalyst coating 160 may have variations in thickness throughout the inlet channel(s) 250. The inlet channel(s) 250 may constitute about 50% of the total surface area of the wall-flow substrate 240.

In some embodiments, the second SCR catalyst coating 180 may have a second SCR catalyst loading of less than or equal to about 150 g/l, less than or equal to about 100 g/l, less than or equal to about 90 g/l or less than or equal to about 80 g/l. The first SCR catalyst loading may be from about 70 g/l to about 100 g/l. The second SCR catalyst loading may be present on about 70-100% of maximum loading in the second SCR catalyst zone, where maximum loading may be about 100-150 g/l, preferably 100 g/l. Additionally or alternatively, the second SCR catalyst coating 180 may be present on a portion of the outlet channels 270 or on substantially all of the outlet channels 270. "Substantially all of the outlet channels" refers to greater than or equal 98%, greater than or equal to 99% or 100% of the outlet channels. It is contemplated herein that the second SCR catalyst coating 180 may have a substantially uniform thickness throughout the outlet channels 270. Alternatively, the second SCR catalyst coating 180 may have variations in thickness throughout the outlet channels 270. The outlet channels 270 may constitute about 50% of the total surface area of the wall-flow substrate 240.

The first SCR catalyst coating 160 and/or the second SCR catalyst coating 180 described herein can optionally comprise a support or binder material (binder). It is contemplated herein that the metals described above may be supported on the zeolite, on the binder, or a combination thereof. Typical methods for incorporation of a metal on a zeolite and/or binder include impregnation (such as by incipient wetness), ion exchange, deposition by precipitation, and any other convenient method for depositing a metal on a zeolite and/or binder.

Binders may be catalytically active or inactive and include other zeolites, other inorganic materials such as clays and metal oxides such as alumina, silica, silica-alumina, titania, zirconia, Group 1 metal oxides, Group 2 metal oxides, and combinations thereof. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders.

A binder may be present in the first SCR catalyst coating and/or the second SCR catalyst coating in an amount of about at least about 5 wt. %, at least about 10 wt. % or at least about 20 wt. %, based on total weight of the washcoating.

In various aspects, the first SCR catalyst coating 160 and the second SCR catalyst coating 180 may be applied to the substrate 240 as a washcoating. This may be accomplished by standard washcoating techniques known in the art. For example, an aqueous slurry of binder particles (e.g., alumina) and iron-exchanged zeolite (Fe-beta particles) or copper-exchanged zeolite (e.g., Cu-chabazite) particles may be prepared. The substrate may then be immersed into the slurry and excess slurry removed to provide a thin coating of the slurry on the walls of the channels of the substrate. For example, in order to provide the first SCR catalyst coating 160 on the substrate 240 in the inlet channel(s) 250, the outlet channels 270 may be blocked or prevented from contacting the slurry (e.g., containing Fe-beta particles and binder particles), such that the slurry only contacts and coats the inlet channel(s) 250 thereby forming the first SCR catalyst coating 160. Then, to provide the second SCR catalyst coating 180 on the substrate 240 in the outlet channels 270, the inlet channel(s) 250 may be blocked or prevented from contacting the slurry (e.g., containing Cu-chabazite particles and binder particles), such that the slurry only contacts and coats the outlet channels 270 thereby forming the second SCR catalyst coating 180. The coated substrate is then dried and calcined to provide an adherent coating of the catalytic component to the walls of the channels thereof. One or more additional layers may be provided to the substrate. After each layer is applied, or after a number of desired layers is applied, the substrate is then dried and calcined to provide a finished SCRF 115.

The SCRF 115 is adapted to provide reduction of $NO_x$ and collection of PM over most of the operating temperature range of exhaust gas treatment system 100 and engine 101, including typical exhaust treatment system operating temperatures of at about 356° F. (180° C.), and may be more preferably operated in the range of about 482° F. (250° C.) to about 1022° F. (550° C.). Below are exemplary conversion chemical reactions contemplated with the SCRF 115:

Urea decomposition:

$$CO(NH_2)_2 + H_2O \rightarrow 2NH_3 + CO_2 \quad (5)$$

$NO_x$ reduction reactions in SCRF 115:

$$6NO + 4NH_3 \rightarrow 5N_2 + 6H_2O \quad (6)$$

$$4NO + 4NH_3 + O_2 \rightarrow 4N_2 + 6H_2O \quad (7)$$

$$6NO_2 + 8NH_3 \rightarrow 7N_2 + 12H_2O \quad (8)$$

$$2NO_2 + 4NH_3 + O_2 \rightarrow 3N_2 + 6H_2O \quad (9)$$

$$NO + NO_2 + 2NH_3 \rightarrow 2N_2 + 3H_2O \quad (10)$$

$$C(soot), HC + O_2 \rightarrow CO_2, H_2O \quad (11)$$

It should be appreciated that SCRF 115 may be configured to perform any one of the above conversions, or combinations of the above conversions, including all of the above conversions. During reduction of $NO_x$, the following undesirable conversion chemical reactions may be also occur producing nitrous oxide ($N_2O$):

$$NH_4NO_3 \rightarrow N_2O + 2H_2O \quad (12)$$

$$2NH_3 + 2NO_2 \rightarrow N_2O + N_2 + 3H_2O \quad (13)$$

$$2NH_3 + 2O_2 \rightarrow N_2O + 3H_2O \quad (14).$$

Nitrous oxide ($N_2O$) can also be formed in the OC unit 110 via chemical reaction (4) above. It was unexpectedly discovered, that the SCRF 115 as described herein including the combination of the first SCR catalyst coating 160 comprising an iron-exchanged zeolite as described herein and the second SCR catalyst coating 180 comprising a copper-exchanged zeolite as described herein may advantageously reduce the production of $N_2O$, for example, by preventing or limiting $N_2O$ production via chemical reactions (6), (14), (15), and/or (16).

In some embodiments, the SCRF 115 may be housed within a housing (not shown), such as a metal can, configured to provide support and direct the exhaust gas flow 103 into, through and out of SCRF 115. The housing may have any suitable shape or size including a cylindrical shape. The housing may also include attachment features located proximate to an inlet opening, such as an inlet pipe, and an outlet opening, such as an outlet pipe, for fluid coupling of the SCRF 115 to an exhaust pipe and/or other component of the exhaust gas treatment system 100. It should be appreciated that the SCRF 115, including housing, may include one or more additional components for facilitating operation of the exhaust gas treatment system 100, including, but not limited to, sensors, dosing devices (urea or fuel injectors) or otherwise. Such additional features may be particularly advantageous for monitoring characteristics of the exhaust gas, such as the amounts or flow rates of certain emission constituents, which are particularly advantageous for control of the exhaust gas treatment system 100.

C. Optional Further Components

In some embodiments, the system 100 may further include a selective catalytic reduction (SCR) catalyst 120 connected to the SCRF 115 for further reducing $NO_x$ present in the exhaust gas flow 104 to produce exhaust gas flow 105. The SCR catalyst 120 may be any suitable SCR catalyst capable of reducing $NO_x$, for example, an iron-exchanged zeolite as described herein or a copper-exchanged zeolite as described herein. The SCR catalyst 120 may disposed on a substrate, such as a honeycomb monolith as described herein. The SCR catalyst 120 may be housed in a housing (not shown), such as a metal can, configured to provide support and direct the exhaust gas flow 104 into, through and out of SCR catalyst 120. The housing may have any suitable shape or size including a cylindrical shape. The housing may also include attachment features located proximate to an inlet opening, such as an inlet pipe, and an outlet opening, such as an outlet pipe, for fluid coupling of the SCR catalyst 120 to an exhaust pipe and/or other component of the exhaust gas treatment system 100.

Exhaust treatment system 100 may also include singly, or in combination, additional exhaust after-treatment devices, including catalyzed or uncatalyzed particulate filters, additional oxidation catalysts, catalyzed soot filters, soot filters, $NO_x$ traps, NSR catalysts, partial hydrocarbon oxidation catalysts, air pumps, external heating devices, precious metal catalysts, sulfur traps, phosphorous traps, $PO_x$ reformers and the like. Each of the additional exhaust after-treatment devices employs technologies having various capabilities for treating the constituent elements of the exhaust gas flow 102, 103, 104, and/or 105. These devices may be fluidly connected in series or parallel using known pipes, conduits and connectors II. Methods for Reducing Production of Nitrous Oxide ($N_2O$)

As discussed above, undesirable $N_2O$ may be produced during oxidation of hydrocarbons in the OC unit 110 and/or during reduction of $NO_x$ in the SCRF 115. It has been discovered that production of $N_2O$ may be reduced by using the SCRF 115 configured as described above. Thus, methods for reducing production of $N_2O$ during selective catalytic reduction of an exhaust gas stream are provided herein. The method may include contacting the exhaust gas stream comprising nitrogen oxides ($NO_x$) and ammonia ($NH_3$) with an SCRF as described herein (e.g., SCRF 115) and converting the $NO_x$ to $N_2$ to produce a treated exhaust gas stream (e.g., exhaust gas flow 104). The treated exhaust gas stream may comprise less than or equal to about 10 vol. % $N_2O$, less than or equal to about 5 vol. % $N_2O$, less than or equal to about 2 vol. % $N_2O$ or less or equal to than about 1 vol. % $N_2O$; or in range from about 0.1-5 vol. %, about 0.1-2 vol. % or about 0.1-1 vol. %.

The SCRF comprises a wall-flow substrate as described herein defining inlet channels as described herein for receiving the exhaust gas stream and ammonia and outlet channels as described herein through which the treated exhaust gas stream exits, wherein the inlet channels and the outlet channels are connected to one another through porous walls of the inlet and outlet channels. The ammonia may be introduced through a urea solution, e.g. a diesel exhaust fluid (DEF) solution, as described herein. The SCRF may further comprise a first SCR catalyst zone as described herein present in the inlet channels, wherein the first SCR catalyst zone has a first SCR catalyst loading as described herein and comprises a first SCR catalyst coating comprising an iron-exchanged zeolite as described herein (e.g., Fe-beta) and optionally, a binder as described herein. The SCRF may further comprise a second SCR catalyst zone present as described herein in the outlet channels, wherein the second SCR catalyst zone has a catalyst loading as described herein and comprises a second SCR catalyst coating comprising a copper-exchanged zeolite as described herein (Cu-chabazite) and optionally, a binder as described herein. The combined first SCR catalyst loading and the second SCR catalyst loading may be less than or equal to about 200 g/l.

The methods may further comprise contacting the exhaust gas stream with an oxidation catalyst as described herein, such as a diesel oxidation catalyst, to oxidize hydrocarbons (HC) to carbon dioxide $CO_2$ and water ($H_2O$) amongst other reactions described herein, prior to contacting the exhaust gas stream with the SCRF. In some embodiments, the treated exhaust gas stream may also be contacted with an SCR catalyst as described herein for further reduction of $NO_N$.

EXAMPLES

Example 1

Emission performance was measured on a 2013 1.6 L turbocharged diesel engine with an exhaust after-treatment system. The exhaust after-treatment system included a close-coupled DOC and SCR catalyst with a diesel exhaust fluid (DEF) injection system, which was tested in two different configurations. The DEF solution used was an aqueous urea solution (32 wt. % urea). The SCR catalyst was present as a washcoating on a flow-through substrate. Configurations 1 and 2 only differed in the SCR catalysts used. In Configuration 1, the SCR catalyst was a Cu-zeolite SCR washcoating on the flow-through substrate channels. In Configuration 2, the SCR catalyst was a combination of a Fe-zeolite SCR washcoating present on an inlet region of the flow-through substrate channels and a Cu-zeolite SCR washcoating present on an outlet region of the flow-through channels.

Figure 3:
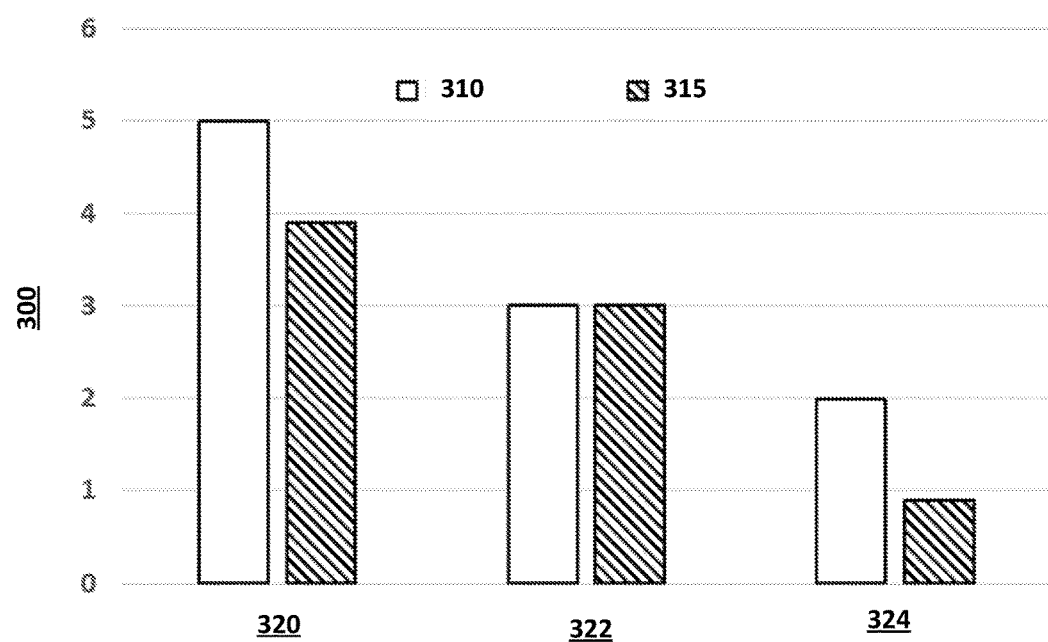
FIG. 3 illustrates comparison of nitrous oxide ($N_2O$) yield (wt. %) 300 of an exhaust gas stream for the following: total $N_2O$ yield 320, $N_2O$ yield from the diesel oxidation catalyst (DOC) 322, and $N_2O$ yield from the selective catalytic reduction (SCR) catalyst 324. The white bar 310 represents $N_2O$ yield for Configuration 1, and the cross-hatched bar 315 represents $N_2O$ yield for Configuration 2.

$N_2O$ were measured by Fourier-transform infrared spectroscopy (FTIR) located at the DOC-out and SCR-out. The test protocol for engine dynamometer testing consisted of high temperature purge, prep cycle with DEF injection and the cold-start US FTP-72 cycle with DEF injection. The results are shown in FIG. 3, compares nitrous oxide ($N_2O$) yield (wt. %) 300 of an exhaust gas stream for the following: total $N_2O$ yield 320, $N_2O$ yield from the DOC 322, and $N_2O$ yield from the SCR catalyst 324. The white bar 310 represents $N_2O$ yield for Configuration 1 and the cross-hatched bar 315 represents $N_2O$ yield for Configuration 2. As shown in FIG. 3, Configuration 2 with the SCR catalyst including both the Fe-zeolite SCR washcoating and the Cu-Zeolite SCR washcoating produced less $N_2O$ than Configuration 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A selective catalytic reduction filter (SCRF) comprising:
   a wall-flow substrate defining inlet channels for receiving exhaust gas and outlet channels through which the exhaust gas exits, wherein the inlet channels and the outlet channels are connected to one another through porous walls of the inlet and outlet channels;
   a first selective catalytic reduction (SCR) catalyst zone present in the inlet channels, wherein the first SCR catalyst zone has a first SCR catalyst loading and comprises a first SCR catalyst coating comprising an iron-exchanged zeolite; and
   a second SCR catalyst zone present in the outlet channels, wherein the second SCR catalyst zone has a second SCR catalyst loading and comprises a second SCR catalyst coating comprising a copper-exchanged zeolite;
   wherein the combined first SCR catalyst loading and the second SCR catalyst loading is less than or equal to about 200 g/l.

2. The SCRF of claim 1, wherein the combined first SCR catalyst loading and the second SCR catalyst loading is about 110-200 g/l.

3. The SCRF of claim 1, wherein the first SCR catalyst loading is about 40-100 g/l and/or the second SCR catalyst loading is about 70-100 g/l.

4. The SCRF of claim 1, wherein the first SCR catalyst coating and/or the second SCR catalyst coating further comprises a binder.

5. The SCRF of claim 1, wherein iron is present in amount from about 0.5-15 wt. % in the iron-exchanged zeolite and/or copper is present in amount from about 0.5-10 wt. % in the copper-exchanged zeolite.

6. The SCRF of claim 1, wherein the zeolite of the iron-exchanged zeolite has a BEA framework type and/or the zeolite of the copper-exchanged zeolite has a CHA framework type.

7. The SCRF of claim 1, wherein the iron-exchanged zeolite is Fe-beta and/or the copper-exchanged zeolite is Cu-chabazite.

8. The SCRF of claim 1, wherein the wall-flow substrate is formed from a ceramic or metallic material.

* * * * *